(12) United States Patent
Hilliar Isaacson

(10) Patent No.: US 8,082,097 B2
(45) Date of Patent: Dec. 20, 2011

(54) METHOD OF ROUTING A FIRST PERSONAL NAVIGATION DEVICE AWAY FROM A SECOND PERSONAL NAVIGATION DEVICE

(75) Inventor: Thomas Edward Hilliar Isaacson, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 454 days.

(21) Appl. No.: 12/344,220

(22) Filed: Dec. 25, 2008

(65) Prior Publication Data

US 2010/0169002 A1   Jul. 1, 2010

(51) Int. Cl.
*G01C 21/00* (2006.01)
*G06F 15/16* (2006.01)

(52) U.S. Cl. ........ 701/207; 701/204; 701/300; 455/54.1

(58) Field of Classification Search ............... 701/207, 701/300, 301, 204, 205, 41; 709/227; 340/436; 455/54.1
See application file for complete search history.

(56) References Cited

U.S. PATENT DOCUMENTS

| | | | |
|---|---|---|---|
| 6,816,782 B1 * | 11/2004 | Walters et al. | 701/209 |
| 6,885,874 B2 * | 4/2005 | Grube et al. | 455/520 |
| 7,451,030 B2 * | 11/2008 | Eglington et al. | 701/50 |
| 7,480,564 B2 * | 1/2009 | Metzler et al. | 701/207 |
| 7,761,235 B2 * | 7/2010 | Winkler et al. | 701/301 |
| 7,911,382 B2 * | 3/2011 | Liu et al. | 342/357.64 |
| 2007/0233374 A1 * | 10/2007 | Diekhans et al. | 701/209 |

* cited by examiner

*Primary Examiner* — Tan Q Nguyen
(74) *Attorney, Agent, or Firm* — Winston Hsu; Scott Margo

(57) ABSTRACT

A method of routing a first personal navigation device (PND) away from a second PND, the method includes receiving a position or second route of the second PND, and generating a first route for the first PND that maintains at least a threshold distance from the position or second route of the second PND.

18 Claims, 5 Drawing Sheets

METHOD OF ROUTING A FIRST PERSONAL NAVIGATION DEVICE AWAY FROM A SECOND PERSONAL NAVIGATION DEVICE

BACKGROUND OF THE INVENTION

1. Field of the Invention

The present invention relates to personal navigation device (PND) navigation, and more particularly, to a method of routing a first PND away from a second PND.

2. Description of the Prior Art

A number of navigation methods have been employed over the centuries by sailors desiring to go from one place to another without getting lost on the way or passing through dangerous waters. Whereas in the past, navigation was typically of interest to navigators on marine vessels, as more advanced navigation systems are developed, drivers, hikers, and tourists are rapidly adopting Global Navigation Satellite System (GNSS) receivers as aids in their travels.

One key to navigation is positioning, or the art of knowing precisely where one is at any given moment. In the past, positioning was accomplished through use of a sextant, which measures angular positions of celestial bodies relative to the horizon. Today, positioning can be accomplished with fair accuracy by GNSS receivers. Currently, only the NAVSTAR Global Positioning System (GPS) developed by the United States Department of Defense offers comprehensive positioning satellite coverage around the globe, though other systems should become operational by the year 2010.

A typical GPS receiver will include an antenna for receiving electrical signals transmitted by GPS satellites, and positioning circuitry for determining a position of the GPS receiver from the electrical signals, and generating corresponding position data. The antenna can be integrated into the GPS receiver, or can be connected externally through a wire. A personal navigation device (PND) can integrate the GPS receiver and further means for providing functions that use the position data generated by the GPS receiver. Typically, the PND can be a standalone mobile device, or can be integrated into an automobile as another instrument on the dashboard. The standalone mobile device can also be adapted for use in an automobile through a mount, which can be attached to the automobile through suction cups or other more permanent means.

The PND will typically include an internal map, which can be used in conjunction with the position data to determine where the PND is located on the map. Based on this information, a navigator function of the PND can calculate a route along known roads from the position of the PND to another known location.

As the PND becomes more sophisticated, the position data and route data may be shared between PNDs, allowing for new applications and functionalities that should be explored further. Please refer to FIG. 1, which is a diagram of performing routing in the PND according to the prior art. Two routes are shown in FIG. 1. A first route R1 is determined for a first PND, and a second route R2 is determined for a second PND. As shown in FIG. 1, the second route R2 overlaps with part of the first route R1. However, in the prior art, if the user of the first PND does not want to run into the user of the second PND, it is likely that an unwanted encounter will occur.

SUMMARY OF THE INVENTION

According to an exemplary embodiment of the present invention, a method of routing a first personal navigation device (PND) away from a second personal navigation device comprises receiving a position of the second PND, and generating a route for the first PND that maintains at least a threshold distance from the position of the second PND.

According to a second embodiment of the present invention, a method of routing a first personal navigation device (PND) away from a second PND comprises receiving a second route of the second PND, and generating a first route for the first PND that maintains at least a threshold distance from the second route of the second PND.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
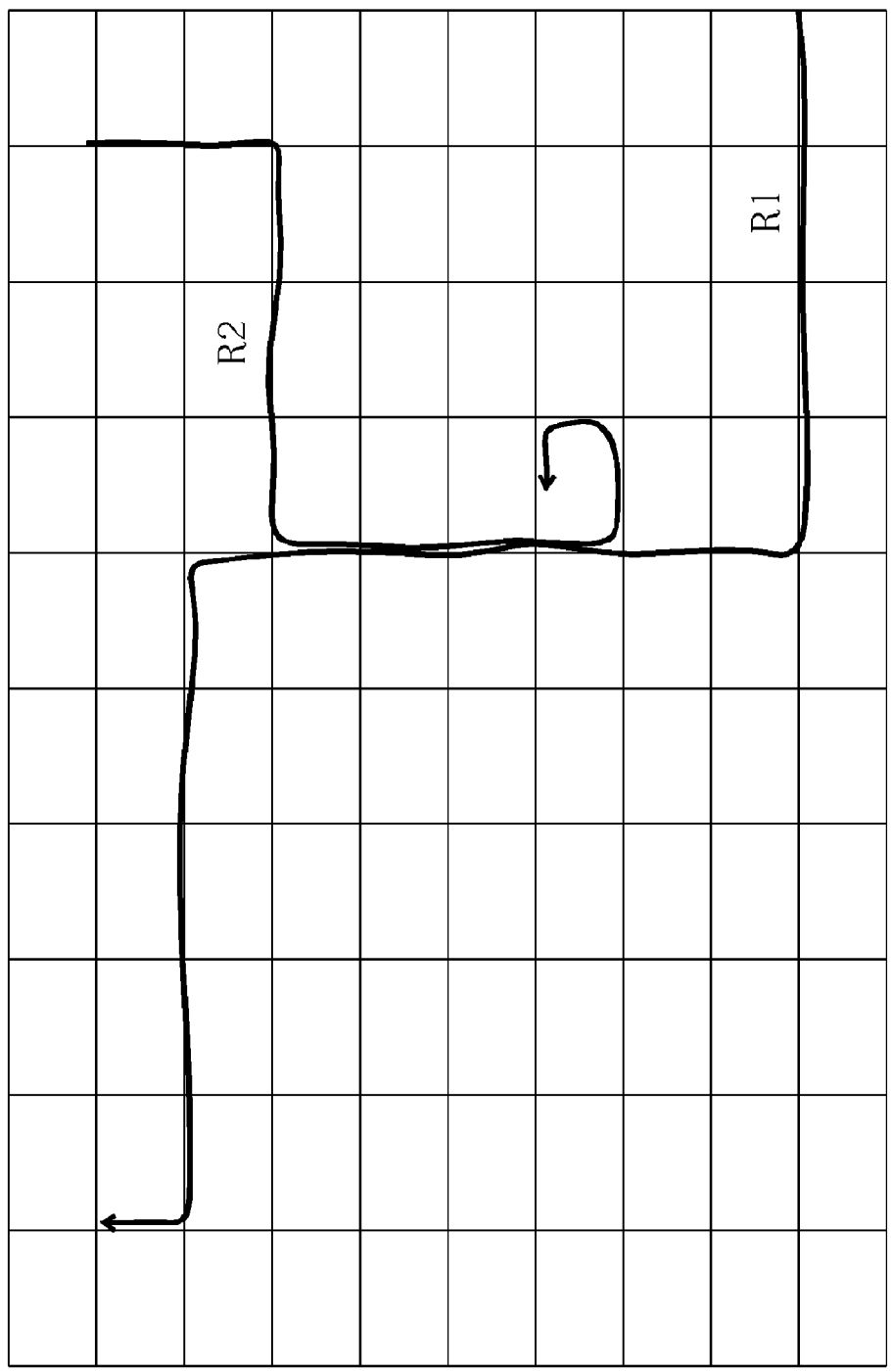
FIG. 1 is a diagram of performing routing in a PND according to the prior art.
Figure 2:
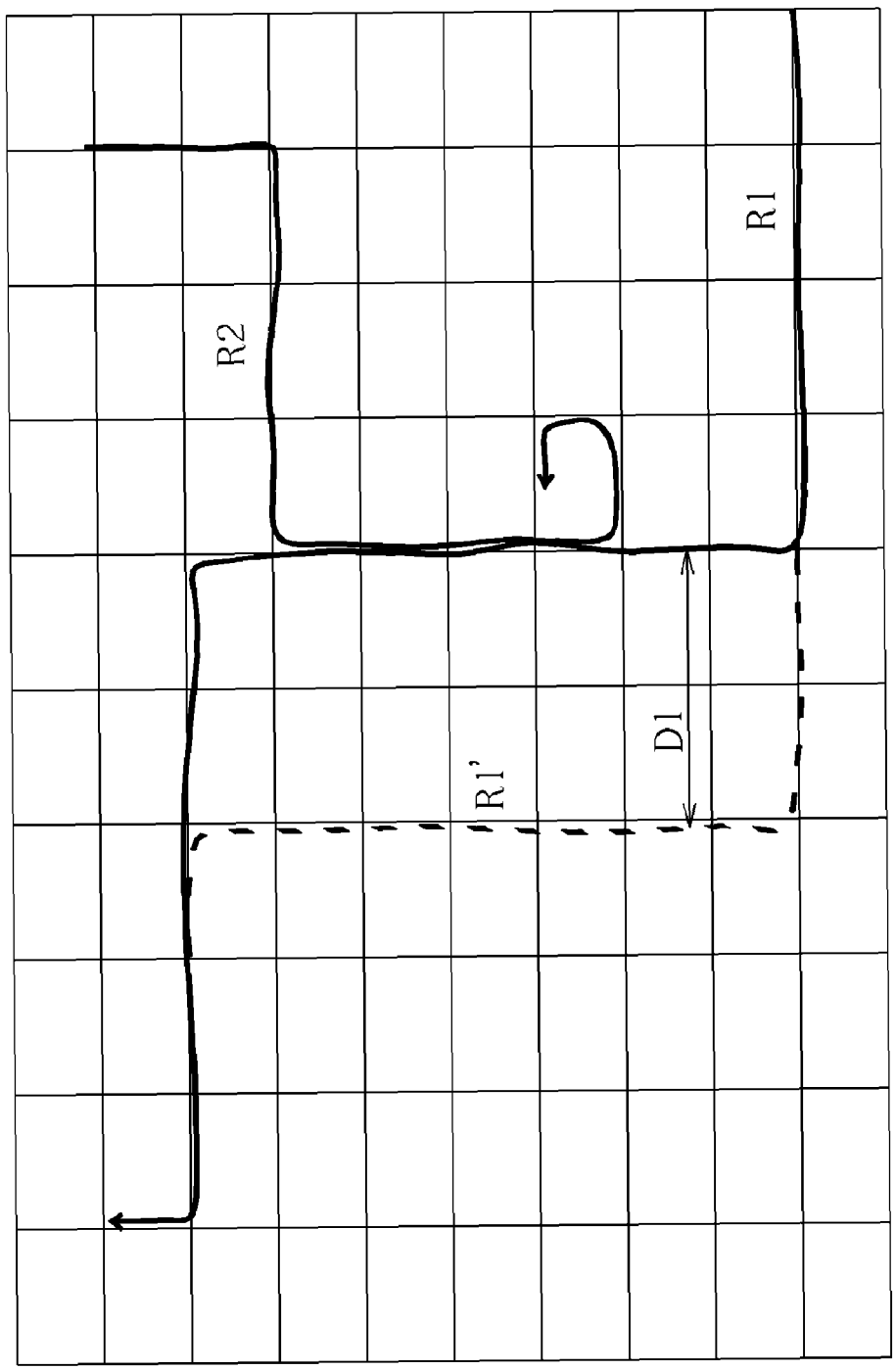
FIG. 2 is a diagram of routing away from a known route in a PND according to an embodiment of the present invention.
Figure 4:
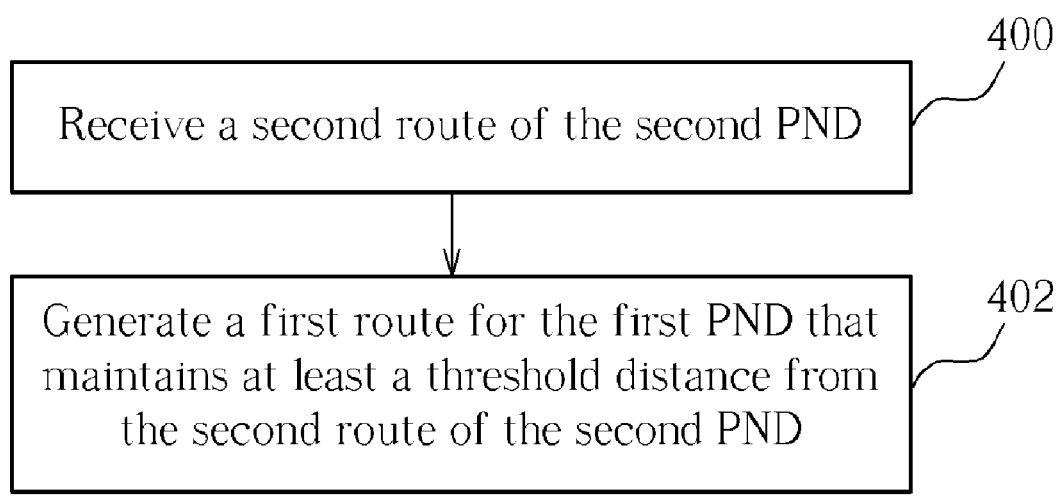
FIG. 4 is a flowchart of a method for performing routing in a PND according to a first embodiment of the present invention.

Please refer to FIG. 2 and FIG. 4. FIG. 2 is a diagram of routing away from a known route in a personal navigation device (PND) according to an embodiment of the present invention. FIG. 4 is a flowchart of a method for performing routing in a PND according to a first embodiment of the present invention. The method may be used to route away from the known route, and comprises receiving a second route R2 of a second PND (Step 400), and generating a first route R1' for a first PND that maintains at least a threshold distance D1 from the second route R2 of the second PND (Step 402), respectively. As shown in FIG. 2, the first route R1' that is generated to avoid the second route R2 maintains the threshold distance D1, e.g. two blocks, from the second route R2. In this way, the user of the first PND can avoid the unwanted encounter with the user of the second PND. The threshold distance D1 may be a preset, or may be set by the user of the first PND, and may be expressed in feet, meters, miles, kilometers, number of blocks, number of streets, or any number of other units of measure of distance.

Figure 3:
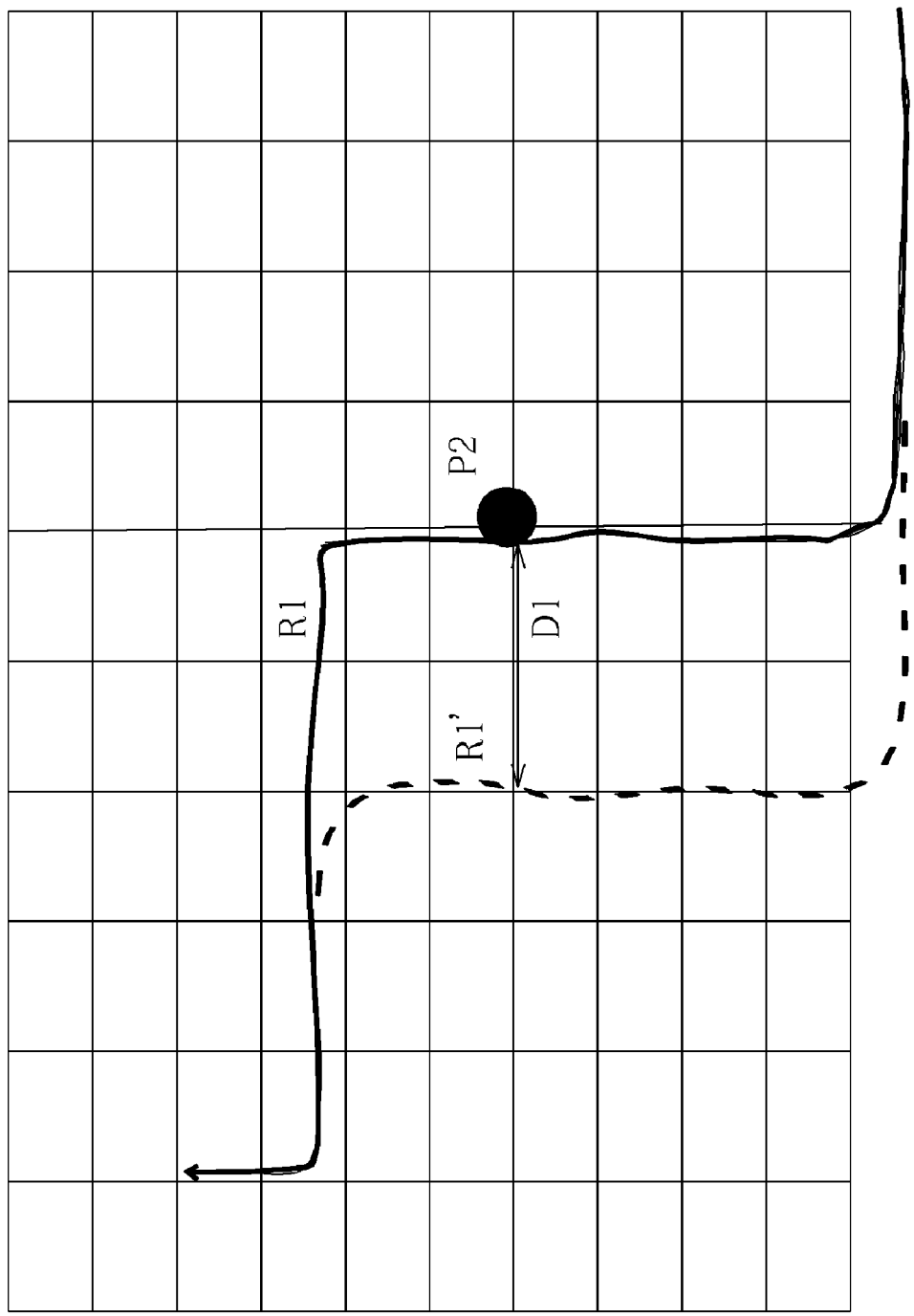
FIG. 3 is a diagram of routing away from a known position in a PND according to an embodiment of the present invention.
Figure 5:
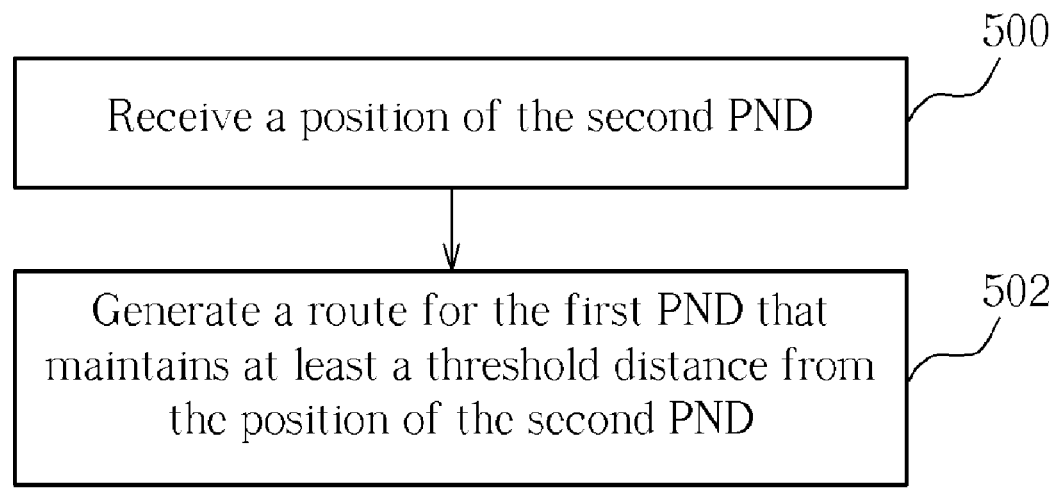
FIG. 5 is a flowchart of a method for performing routing in a PND according to a second embodiment of the present invention.

Please refer to FIG. 3 and FIG. 5. FIG. 3 is a diagram of routing away from a known position in a personal navigation device (PND) according to an embodiment of the present invention. FIG. 5 is a flowchart of a method for performing routing in a PND according to a second embodiment of the present invention. As shown in FIG. 3, the method may also be used to route away from a known position, and comprises receiving a position P2 of the second PND (Step 500), and generating the first route R1' for the first PND that maintains at least the threshold distance D1 from the position P2 of the second PND (Step 502), respectively. As shown in FIG. 3, the first route R1' that is generated to avoid the position P2 maintains the threshold distance D1, e.g. two blocks, from the position P2. In this way, the user of the first PND can avoid the unwanted encounter with the user of the second PND. The threshold distance D1 may be a preset, or may be set by the user of the first PND, and may be expressed in feet, meters, miles, kilometers, number of blocks, number of streets, or any number of other units of measure of distance.

As regards receiving the position P2 of the second PND, or receiving the second route R2 of the second PND, a number of options are available. The position P2 of the second PND or the second route R2 of the second PND can be transmitted by the second PND to the first PND directly. This could be accomplished by some form of peer-to-peer network connection. The second PND could also share the position P2 of the second PND or the second route R2 of the second PND as a file or a set of files that the first PND could download, or read, through a network. The second PND could also broadcast the position P2 of the second PND or the second route R2 of the second PND on a predetermined frequency for other PNDs to receive the position P2 of the second PND or the second route R2 of the second PND. The second PND could also share the position P2 of the second PND or the second route R2 of the second PND by uploading, or transmitting, the position P2 of the second PND or the second route R2 of the second PND to a server, or network database. Then, the first PND could send a request to the server for the position P2 of the second PND or the second route R2 of the second PND. Once the server received the request from the first PND requesting the position P2 of the second PND or the second route R2 of the second PND, the server could then validate the request, open a file transfer connection with the first PND, and send the position P2 of the second PND, the second route R2 of the second PND, or both, to the first PND. To establish the network connection with the server, or network database, the first PND can utilize a modem, a Global Packet Radio Service (GPRS) modem, an Ethernet adapter, a wireless network adapter, or any other network interface card or chip. The first PND could also connect to a personal computer through a Universal Serial Bus adapter, or another type of adapter, to download the position P2 of the second PND or the second route R2 of the second PND from the personal computer. In this way, the position P2 of the second PND or the second route R2 of the second PND can be shared over the Internet, or through a database that can be accessed first through the personal computer.

Once the first PND has obtained the position P2 of the second PND or the second route R2 of the second PND, the first PND can perform many different actions. First, the first PND can display the position P2 of the second PND or the second route R2, or both, in a display of the first PND. This allows the user to see the position P2 of the second PND or the second route R2 of the second PND on a map interface, such as that shown in FIG. 2. Then, the first PND may display an option to "route around" the second PND. If the user of the first PND activates this re-route function, the first PND may route around the position P2 of the second PND or the second route R2 of the second PND. Or, the first PND may automatically re-route if the user has set up the first PND to re-route automatically upon determining that the second PND may come within the predetermined threshold distance of the first PND based on the respective routes of the first PND and the second PND. The first PND may also activate an alarm or notification to alert the user of the first PND that the second PND may approach the first PND within the threshold distance. The first PND may also activate a second notification to alert the user of the first PND that the first PND is recalculating the route R1, or has completed recalculating the route R1. At this point, the recalculated route R1' could be shown on the display of the first PND, and the recalculated route R1' could be used for directing the user of the first PND to take corresponding maneuvers to reach their intended destination.

It is likely that, as the user of the first PND continues along the recalculated route R1', the second PND will update the position P2 of the second PND or the second route R2 of the second PND if, for example, the second PND is in motion or changes its intended destination or route, respectively. In this case, the second PND can use any of the above methods for sharing the position P2 of the second PND or the second route R2 of the second PND to share the position P2 of the second PND or the second route R2 of the second PND with the first PND. Once the first PND receives the update on the position P2 of the second PND or the second route R2 of the second PND, or once the position P2 of the second PND or the second route R2 of the second PND changes, the first PND can be re-routed to continue to avoid the second PND by the threshold distance.

Compared to the prior art, which has no way of re-routing to avoid unwanted encounters with users of other PNDs, the present invention receives the position or second route of the second PND, and generates the route for the first PND that maintains at least the threshold distance from the position or route of the second PND. Thus, the present invention can prevent unwanted encounters with other people.

Those skilled in the art will readily observe that numerous modifications and alterations of the device and method may be made while retaining the teachings of the invention.

What is claimed is:

1. A method of routing a first personal navigation device (PND) away from a second personal navigation device, the method comprising:
   the second PND sharing a position of the second PND; and
   receiving the position of the second PND and reading the position of the second PND;
   displaying the position of the second PND on a display of the first PND;
   generating a route for the first PND that maintains at least a threshold distance from the position of the second PND; and
   re-routing the first PND when an updated position of the second PND is received or when the position of the second PND has changed so as to continue to maintain at least the threshold distance between a position of the first PND and the position of the second PND.

2. The method of claim 1 further comprising establishing a connection with a network database, wherein receiving the position of the second PND is receiving the position of the second PND from the network database.

3. The method of claim 2, wherein establishing the connection with the network database comprises utilizing a modem to establish an internet connection with the network database, utilizing a General Packet Radio Service (GPRS) modem to establish an internet connection with the network database, or utilizing a wireless network adapter to establish an internet connection with the network database.

4. The method of claim 1, further comprising establishing a peer-to-peer connection with the second PND.

5. The method of claim 1, wherein the threshold distance is measured in number of streets.

6. The method of claim 1, further comprising:
   the second PND sending the position to a network database.

7. The method of claim 1, further comprising:
   the second PND broadcasting the position.

8. The method of claim 1, wherein the threshold distance is set by a user of the first PND.

9. The method of claim 1, wherein the threshold distance is measured in feet, meters, miles, kilometers, or number of blocks.

10. A method of routing a first personal navigation device (PND) away from a second personal navigation device, the method comprising:
   the second PND sharing a second route of the second PND;
   receiving the second route of the second PND and reading the second route of the second PND;
   displaying the second route of the second PND on a display of the first PND;
   generating a first route for the first PND that maintains at least a threshold distance from the second route of the second PND; and
   re-routing the first PND when an updated second route of the second PND is received or when the second route of the second PND has changed so as to continue to maintain at least the threshold distance between the first route for the first PND and the second route of the second PND.

11. The method of claim 10, further comprising establishing a connection with a network database, wherein receiving the second route of the second PND is receiving the second route of the second PND from the network database.

12. The method of claim 11, wherein establishing the connection with the network database comprises utilizing a modem to establish an internet connection with the network database, utilizing a General Packet Radio Service (GPRS) modem to establish an internet connection with the network database, or utilizing a wireless network adapter to establish an internet connection with the network database.

13. The method of claim 10, further comprising establishing a peer-to-peer connection with the second PND.

14. The method of claim 10, wherein the threshold distance is measured in number of streets.

15. The method of claim 10, further comprising:
   the second PND sending the second route to a network database.

16. The method of claim 10, further comprising:
   the second PND broadcasting the second route.

17. The method of claim 10, wherein the threshold distance is set by a user of the first PND.

18. The method of claim 10, wherein the threshold distance is measured in feet, meters, miles, kilometers, or number of blocks.

* * * * *